(12) United States Patent
Aaltonen

(10) Patent No.: US 9,846,037 B2
(45) Date of Patent: Dec. 19, 2017

(54) SELF-TEST IN A CLOSED-LOOP VIBRATORY GYROSCOPE

(71) Applicant: MURATA MANUFACTURING CO., LTD., Nagaokakyo-shi, Kyoto (JP)

(72) Inventor: Lasse Aaltonen, Espoo (FI)

(73) Assignee: MURATA MANUFACTURING CO., LTD., Nagokakyo-Shi, Kyoto (JP)

(*) Notice: Subject to any disclaimer, the term of this patent is extended or adjusted under 35 U.S.C. 154(b) by 197 days.

(21) Appl. No.: 14/753,417

(22) Filed: Jun. 29, 2015

(65) Prior Publication Data

US 2015/0377625 A1    Dec. 31, 2015

(30) Foreign Application Priority Data

Jun. 30, 2014    (FI) ..................... 20145628

(51) Int. Cl.
  *G01C 19/56*    (2012.01)
  *G01C 19/5776*  (2012.01)
  *G01C 19/5726*  (2012.01)

(52) U.S. Cl.
  CPC ..... *G01C 19/5776* (2013.01); *G01C 19/5726* (2013.01)

(58) Field of Classification Search
  CPC .................. G01C 19/5726; G01C 19/5776
  See application file for complete search history.

(56) References Cited

U.S. PATENT DOCUMENTS

| | | |
|---|---|---|
| 6,598,455 B1 | 7/2003 | Gutierrez et al. |
| 2010/0263445 A1 | 10/2010 | Hayner et al. |
| 2011/0146402 A1 | 6/2011 | Donadel et al. |
| 2011/0192226 A1 | 8/2011 | Hayner et al. |
| 2014/0250970 A1* | 9/2014 | Fang ............. G01C 25/005 73/1.37 |

FOREIGN PATENT DOCUMENTS

EP    1 265 053 A1    12/2002

OTHER PUBLICATIONS

Partial International Search Report application No. PCT/IB2015/054766.
Finnish Search Report dated Feb. 24, 2015 corresponding to Finnish Patent Application No. 20145628.
A. Trusov et al., "1 ppm precision self-calibration of scale factor in MEMS Coriolis vibratory gyroscopes," Int. Conf. on Solid State Sensors, Actuators and Microsystems, Barcelona, Spain, Jun. 16-20, 2013, pp. 2531-2534.
E. Aktakka et al., "A microactuation and sensing platform with active lockdown for In Situ calibration of scale factor drifts in dual-axis gyroscopes," IEEE/ASME Trans. on Mechatronics, vol. 20 No. 2, Apr. 2015 (date of publication Jun. 11, 2014; current version Oct. 24, 2014), pp. 934-943.

* cited by examiner

*Primary Examiner* — John Chapman, Jr.
(74) *Attorney, Agent, or Firm* — Squire Patton Boggs (US) LLP

(57) ABSTRACT

A closed-loop microelectromechanical gyroscope with a self-test function. At least one test input signal is generated from a signal of the vibrational primary motion and input during operation of the microelectromechanical gyroscope to the sense circuit.

21 Claims, 10 Drawing Sheets

SELF-TEST IN A CLOSED-LOOP VIBRATORY GYROSCOPE

FIELD

The present invention relates to microelectromechanical systems and specifically to self-test method for a microelectromechanical gyroscope and to a gyroscope implementing the method.

DESCRIPTION OF THE RELATED ART

Motion can be considered to have six degrees of freedom: translations in three orthogonal directions and rotations around three orthogonal axes. The latter three may be measured by an angular rate sensor, also known as a gyroscope. MEMS gyroscopes use the Coriolis Effect to measure the angular rate. When a mass is moving in one direction and rotational angular velocity is applied, the mass experiences a force in orthogonal direction as a result of the Coriolis force. The resulting physical displacement caused by the Coriolis force may then be read from, for example, a capacitively, piezoelectrically or piezoresistively sensing structure.

In MEMS gyroscopes the primary motion is typically not continuous rotation as in conventional ones due to lack of adequate bearings. Instead, mechanical oscillation may be used as the primary motion. When an oscillating gyroscope is subjected to an angular motion, an undulating Coriolis force results. This creates a secondary oscillation orthogonal to the primary motion and to the axis of the angular motion, and at the frequency of the primary oscillation. The amplitude of this coupled oscillation can be used as the measure of the angular motion.

MEMS gyroscopes are used in many critical systems, especially in automotive industry, so built-in functionality diagnostics that provides information on critical internal variations of MEMS gyroscopes is essential. Ideally, the component should be capable of identifying its own erroneous operation very rapidly. On the other hand, false alarms that cause unnecessary inconvenience to system users should be effectively avoided.

A line of advanced vibratory gyroscopes applies a closed-loop system where the vibrational sense motion is feedback controlled for enhanced performance. The closed-loop configuration, however, creates also aspects that cannot be met with conventional self-test methods.

For example, a closed-loop system, unlike open-loop one, is heavily dependent on stability of the bias voltage. This is because the magnitude of the force-feedback is inversely proportional to the reference voltage. U.S. Pat. No. 8,459,093 discloses a continuous self-test method, where a modulated test signal is fed to dedicated self-test electrodes of an open-loop gyroscope. This method does not, however, is not well applicable for monitoring the bias voltage levels in a closed-loop configuration. It requires additional dedicated self-test electrodes with very accurate functioning to avoid unnecessary alarms.

On the other hand, in a feedback configuration, variation of some parameters, for example, the signal sensitivity of the detection electrodes, or the gain of the front-end signal chain may be masked by high loop gain at the resonance frequency. Although this is also beneficial by making the system more robust to minor variations, excessive variations in these partly masked parameters may be a risk, as they might compromise the complete operation by, for example, changing the loop dynamic features or causing instability. A simple example is an internal leakage that due to a fault condition causes open-loop non-linearity. This may be efficiently attenuated by the feedback loop, but when the leakage further increases, an abrupt signal blockage occurs and the system becomes unable to produce any rotation rate response. Another example of masked parameters is change of sensitivity of the detection electrodes. A proper self-test should identify these kind of risk conditions before final error conditions occur.

SUMMARY

An object of the present invention is to provide a mode-matched gyroscope that that enables reliable self-testing in a closed-loop configuration, even during normal operation. This and other objectives of the present invention is achieved with embodiments of a gyroscope and a self-test method as described herein.

Embodiments of the present invention include a microelectromechanical gyroscope that includes a body, a drive element suspended to the body for vibrational primary motion in a first direction, and a sense element coupled to the drive element to receive an orthogonal Coriolis force component in a second direction. The second direction is perpendicular to the first direction. The microelectromechanical gyroscope is a closed-loop configuration that includes also a sense circuit for outputting a sense signal that corresponds to forces acting on the sense element in the second direction, and for producing a sense feedback signal to control the vibrational secondary motion of the sense element. For the self-test function, the microelectromechanical gyroscope includes a test signal generator for generating from a signal of the vibrational primary motion at least one test input signal and outputting the test input signal during operation of the microelectromechanical gyroscope to the sense circuit. It also includes a self-test analyzer for extracting from the sense signal at least one test output signal that results from the at least one test input signal, and determining validity of at least one operating parameter of the microelectromechanical gyroscope on the basis of the test output signal.

Embodiments also include a self-test method for a microelectromechanical gyroscope that includes a body, a drive element suspended to the body for vibrational primary motion in a first direction, and a sense element coupled to the drive element to receive an orthogonal Coriolis force component in a second direction. The second direction is perpendicular to the first direction. The microelectromechanical gyroscope is a closed-loop configuration that includes also a sense circuit for outputting a sense signal that corresponds to forces acting on the sense element in the second direction, and for producing a sense feedback signal to control the vibrational secondary motion of the sense element. The method generating from a signal of the vibrational primary motion at least one test input signal and outputting the test input signal during operation of the microelectromechanical gyroscope to the sense circuit, and extracting from the sense signal at least one test output signal that results from the at least one test input signal, and determining validity of at least one operating parameter of the microelectromechanical gyroscope on the basis of the test output signal.

Features and advantages of the claimed invention and its embodiments are described in more detail with the detailed description of the embodiments.

BRIEF DESCRIPTION OF THE DRAWINGS

In the following the invention will be described in greater detail, in connection with preferred embodiments, with reference to the attached drawings, in which.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various generic features of capacitive transducer structures or microelectromechanical devices that are generally known to a person skilled in the art may not be specifically described herein.

Figure 1:
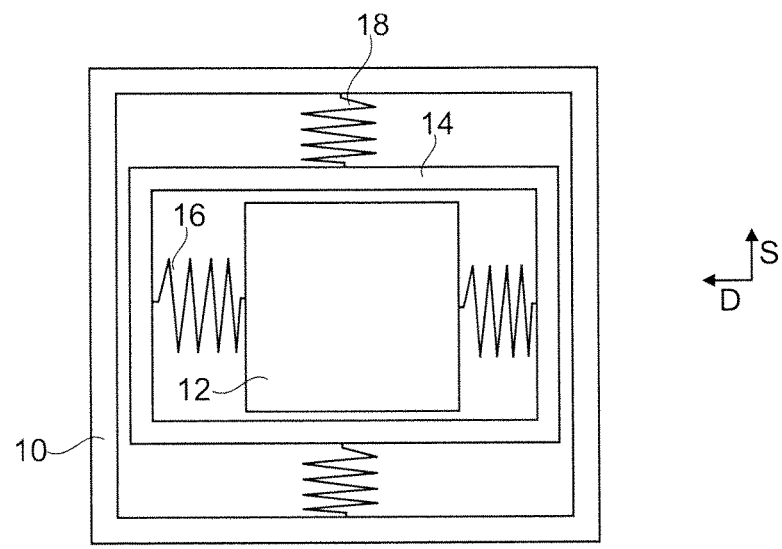
FIG. 1 illustrates elements of a microelectromechanical gyroscope structure.

FIG. 1 illustrates elements of a microelectromechanical gyroscope structure with which embodiments of the present invention may be used. The gyroscope structure may be a layer element that includes in-plane oscillating elements and a non-oscillating body 10 enabled to move with an angular motion to be detected. In FIG. 1, the body is represented by a frame 10 that is fixedly attached to another non-oscillating body element of the gyroscope structure, for example, to an underlying handle wafer, or a covering cap wafer of a gyroscope device. The gyroscope structure may include also one or more seismic masses 12, 14 that are suspended to the body 10 to provide an inertial movement. A seismic mass may be suspended to the static support through a spring structure 16, 18. The spring structure refers here to a combination of elastically directional spring elements that are configured by their dimensions and/or properties to be flexible to displacements of the seismic mass in at least one direction, and very rigid to displacements of the seismic mass in any other directions.

In a gyroscope structure, the spring structure is typically designed to allow displacements of seismic masses in a drive direction D and in a sense direction S. The drive direction D refers here to a designed direction of driven oscillation of the seismic masses 12, 14, i.e. the direction of the linear oscillation during ideal primary motion and in the absence of other forces acting on the structure. The sense direction S refers here to a further designed direction of linear oscillation of a seismic mass, a sense direction that is perpendicular to the drive direction D, and therefore coincides with a detected Coriolis force resulting from angular motion of the gyroscope structure. FIG. 1 illustrates drive and sense directions in the exemplary simplified configuration. In practice, there are many ways to implement resonator structures, and arrange the sense and drive directions into them. Such solutions are widely documented and well known to a person skilled in the art of microelectromechanical devices.

Accordingly, the microelectromechanical structure includes a drive element that includes a drive mass that is suspended to the body to be driven into vibrational primary motion in the drive direction D. In FIG. 1, the drive element is shown to include a first seismic mass 12. The seismic mass 12 may be induced to the vibratory primary motion with a capacitively, piezoelectrically or piezoresistively operated electromechanical transducer or transducer means. As an example, the first seismic mass 12 of FIG. 1 is coupled to one or more capacitive transducers that, in response to an applied drive voltage, generate a controlled mechanical force that induces and maintains the vibrational primary motion of the first seismic mass 12 in the drive direction D.

The microelectromechanical structure includes also a sense element for vibrational secondary motion. The sense element may be mechanically coupled to the drive element to be induced to vibrational secondary motion that takes place in response to rotational motions of the body. In FIG. 1, the sense element is shown to include a second seismic mass 14.

The mechanical coupling may include directional spring structures that deflect elastically in a deflection direction and are very rigid in other directions, especially in directions perpendicular to the deflection direction. In FIG. 1, the first seismic mass 12 is coupled to the second seismic mass 14 with a first directional spring structure 16 that includes one or more directional springs that deflect elastically in the drive direction D and are very rigid in other directions, especially in the sense direction S. The second seismic mass 14 is coupled to the body 10 with a second directional spring structure 18 that includes one or more directional springs that deflect elastically in the sense direction S and are very rigid in other directions, especially in the drive direction D. The first directional spring structure 16 thus allows the first seismic mass 12 to move in the drive direction D within the second seismic mass 14, but the second directional spring structure 18 resists movement of the second seismic mass 14 in direction D.

Applied angular motion about an out-of-plane rotation axis induces to the vibrating first seismic mass 12 a Coriolis force that is orthogonal to the direction of the primary motion, i.e. a force in direction S. The first directional spring structure 16 resists movement of the first seismic mass 12 in direction S and thus relays the force to the second seismic mass 14. The second directional spring structure 18 allows movement of the second seismic mass 14 in respect of the body 10 in the sense direction S. This movement may be detected with a sense transducer coupled to the second seismic mass 14 and adapted to generate a signal that represents the relative motion between the second seismic mass 14 and the body 10. The generated signal may be used as a measure of the applied angular motion.

It is noted that the configuration of FIG. 1 is only an example of a gyroscope structure with two orthogonal main modes. The coupling between the drive mass and the sense mass may be mechanical, as in FIG. 1, or electrical such that the masses are separately but simultaneously driven into the primary vibrational motion. A gyroscope structure may have a single vibrating mass or multiple vibrating masses that undergo linear or torsional motions, in-plane or out-of-plane. Also mode decoupling may be achieved with many ways, depending on the optimized parameters. For example, various frame-based architectures may be applied for minimization of cross-coupling effects.

Figure 2:
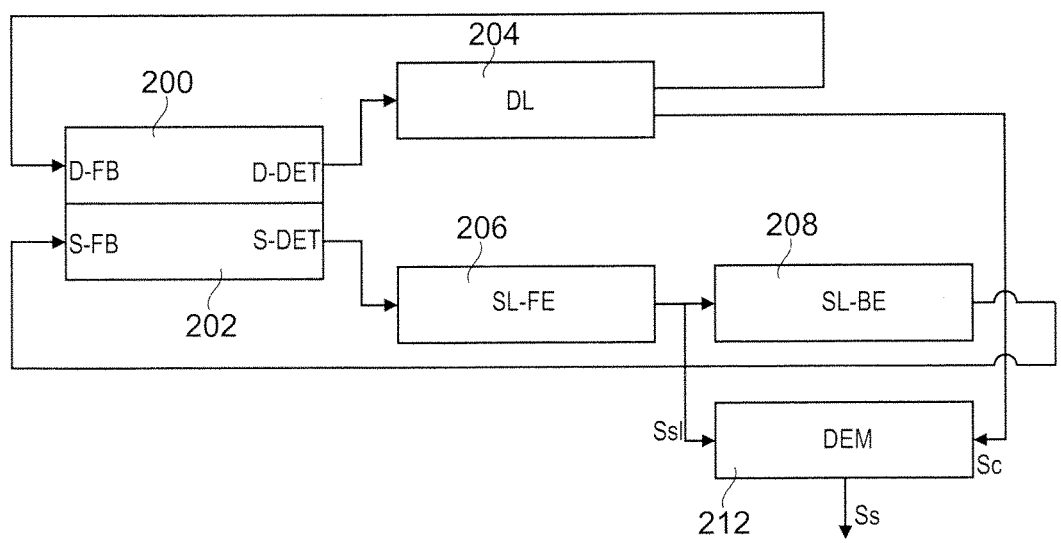
FIG. 2 illustrates elements of a microelectromechanical gyroscope.

FIG. 2 illustrates elements of a microelectromechanical gyroscope with which embodiments of the invention may be implemented. The gyroscope comprises a drive element 200 and a sense element 202. As described above, the drive element 200 and the sense element 202 may be mechanically coupled to a body (not shown) and to each other such that rotational motion of the body induces a detectable secondary motion in the sense element.

The drive element 200 is part of a drive circuit, a logical element that represents here a combination of components of the mechanical drive element of the gyroscope, one or more electromechanical transducers, and signal conditioning and processing elements that operate on a signal or signals received from and input into the drive element. It is understood that a logical element may be physically implemented in one or more integrated circuit elements, or share physical components with other logical circuits.

The drive circuit includes also a drive loop circuit 204 that inputs from the drive element 200 a drive sense signal D-DET that corresponds to the vibrational primary motion of the drive mass. The drive loop circuit is adapted to generate a primary signal Sc of a specific driving frequency T_f0 in phase with the primary vibrational motion of the drive element. The primary signal Sc may include a signal component in phase with the position and/or velocity of the vibrating mass of the drive element. Also the drive circuit is advantageously a feed-back system, i.e. a system that feeds back some of the output to the input of a system. In this context this means that the drive loop circuit 204 may also be adapted to produce a drive feedback signal D-FB to control the primary vibrational motion of the vibrating mass of the drive element. The primary motion of the drive element 200 may be sensed with one or more transducers that convert the vibrational motion into the drive sense signal D-DET, and the drive force may be applied with one or more transducers that convert the drive feedback D-FB signal into a mechanical driving force.

A transducer refers in general to a device that converts one form of energy to another. For example, a physical property may be detected and converted into a measurable signal. The physical property and the means for detecting the form of energy may vary according to the application. In one category of sensors, a characteristic representing a detected physical property may comprise detection of displacement of a reference point with respect of an inertial frame of reference. The displacement may be detected, for example, as movement of a suspended proof-mass, or as stress or strain exerted on a transducer element connected to an elastic suspension that carries the proof-mass. The detected displacement, stress or strain may be used to modulate electrical signals, which makes the physical property quite accurately measurable. As another example, in actuators, transducers may be used to convert electrical energy into some form of motion.

Figure 3:
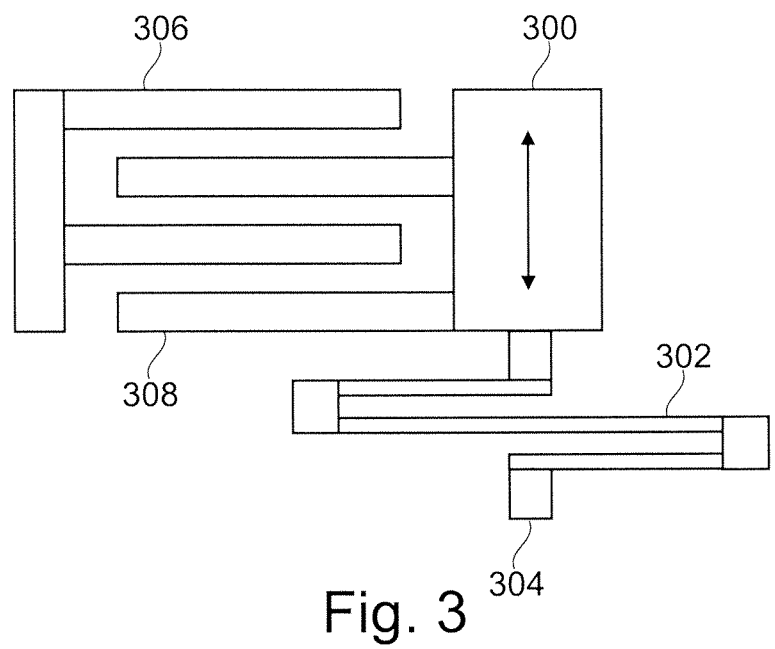
FIG. 3 shows a simplified example of a transducer.

FIG. 3 shows a simplified example of a mass-spring system applicable for transducing displacements into electrical signals. The system may have a proofmass 300 and a spring element 302 anchored at anchor point 304 to a sensed object (not shown). The system may have also one or more stationary electrodes 306 anchored to the body and one or more movable electrodes 308 connected to the motion of the proofmass 300. The transducer for measuring the displacement in FIG. 3 may be based on a capacitive effect, wherein capacitance between electrodes 306 and 308 changes when the distance between them changes. This change in capacitance may be used to modulate an electrical signal output from the transducer.

Figure 4:
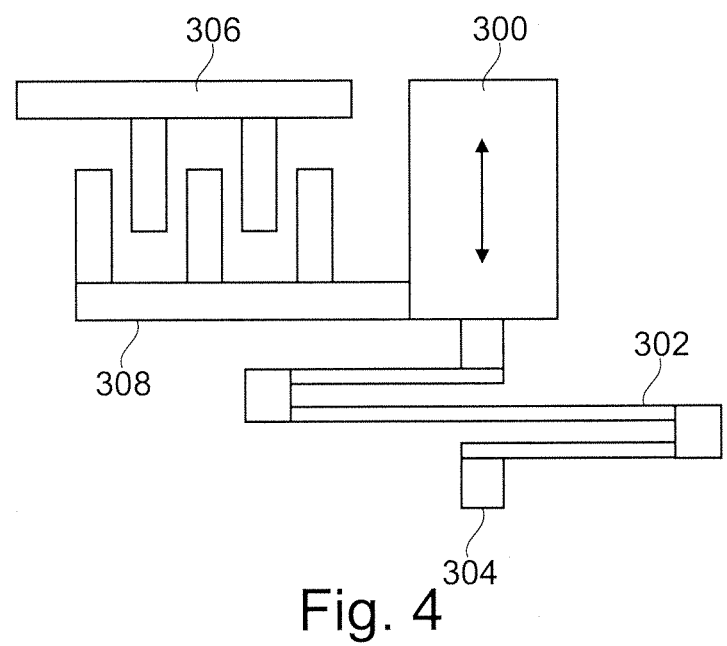
FIG. 4 shows another simplified example of a transducer.

FIG. 4 shows another type of capacitive transducer; same reference numerals are used to refer to corresponding elements in FIGS. 3 and 4. In the transducer of FIG. 4, modulation of the electrical signal corresponds to change in the overlapping areas of the electrodes 306 and 308. The transducers shown in FIGS. 3 and 4 measure displacement of a proof element based on a capacitive effect, but other types of proof elements indicating, for example, strain or stress exerted on the proof element, and other types of effects, like piezoelectric, and electromagnetic effect that transform a detected indication of a physical property to an electrical signal may be applied.

Returning back to FIG. 2, the sense element 202 is part of a sense circuit, a logical element that represents here a combination of components of the mechanical sense element of the gyroscope, one or more electromechanical transducers, and signal conditioning and processing elements that operate on a signal or signals received from and input into the sense element 202. The sense circuit is a feedback system that includes a closed sense loop circuit. A gyroscope that includes such a closed sense loop circuit is called herein a closed-loop gyroscope.

In FIG. 2 the sense loop circuit is shown to include a sense loop front-end part (SL-FE) 206 and a sense loop back-end part (SL-BE) 208. The SL-FE 206 inputs from the sense element transducer a sense signal S-DET that corresponds to the detected Coriolis motion of the sense element, and generates therefrom a sense loop output signal Ssl. The SL-FE advantageously includes at least a capacitance-to-voltage converter, amplifiers and an amplitude control element. When the sense loop signal Ssl is used as an analog sense loop output signal, a further scaling point may need to be arranged to the signal path before the demodulation. In the feedback path, the sense loop output signal Ssl is advantageously input to the SL-BE 210 for scaling (amplification). In the configuration of FIG. 2, the SL-BE generates a sense feedback signal S-FB, according to which a force restricting the secondary vibrational motion in the sense element 202 is to be controlled.

The gyroscope also includes a demodulation element 212. The demodulation element 212 may receive as inputs the primary signal Sc and the sense loop output signal Ssl, and demodulates the amplitude modulated sense loop output signal Ssl using the primary signal Sc. The demodulator outputs a gyroscope output signal Ss that can be applied as a measurement signal for the detected angular motion.

Figure 5:
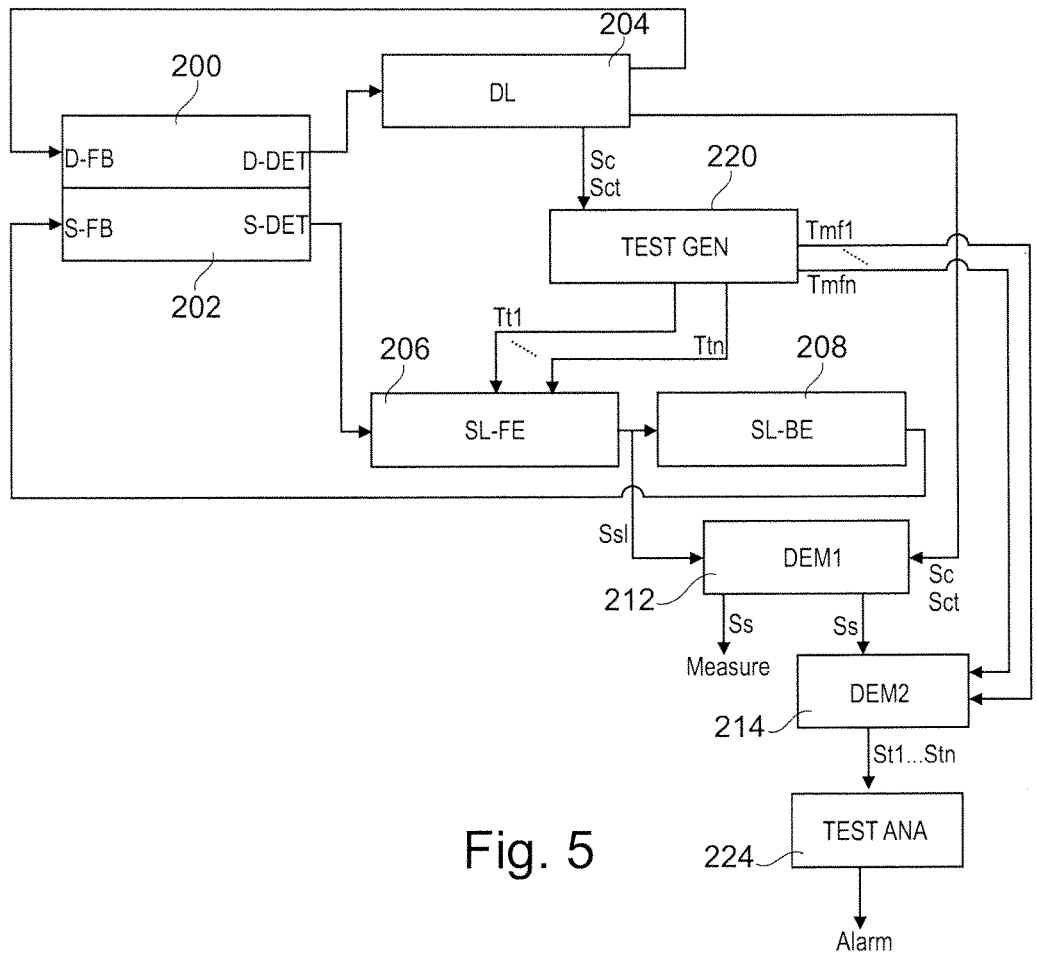
FIG. 5 illustrates an exemplary embodiment of a gyroscope with an enhanced continuous self-test arrangement.

FIG. 5 illustrates an exemplary embodiment of a gyroscope with an enhanced continuous self-test arrangement. Elements already discussed in FIG. 2 are denoted with same reference numerals. As shown in FIG. 5, the gyroscope may be further complemented with a test circuit that includes a test signal generator 220, and a test signal analyzer 224. The test signal generator 220 is adapted to receive from the drive loop 204 at least one signal that corresponds to the vibratory primary motion, generate therefrom one or more test input signals Tt1 . . . Ttn, and input the one or more test input signals Tt1 . . . Ttn during operation of the gyroscope to the sense circuit. The test signal analyzer 224, together with demodulation stages 212, 214 forms a self-test analyzer that is adapted to detect effect of the one or more test input signals Tt1 . . . Ttn in the output signal of the sense circuit, and trigger an alarm, if an abnormal response appears.

In the exemplary configuration of FIG. 5, the test signal generator 220 is coupled to the drive loop 204 to receive therefrom at least the primary signal Sc, for example, a sinusoidal signal in the driving frequency T_f0. The test signal generator 220 may also receive from the drive loop a separate timing signal Sct synchronized to the primary signal Sc. The timing signal Sct may be, for example, a clock signal taken from a phase-locked loop (PLL) in the drive loop. The primary signal Sc may include a signal in phase with velocity and/or position of a vibrating mass in the drive element, or a combination of component signals in phase with velocity and position of the vibrating mass in the drive element. In the latter case, the carrier signal for demodulation may be generated in the test signal generator as an optimised combination of the component signals. Thus, the carrier signal may include fixed constant portions of position and velocity matching phase components. For simplicity, in FIG. 5, the carrier signal for demodulation is shown to correspond to the primary signal Sc.

The test signal generator 220 may be adapted to generate from the primary signal or from the timing signal Sct one or more test frequency signals T_mf1 . . . T_mfn, frequencies of which are synchronized to the driving frequency T_f0. Generated test frequency period may be any multiple of the primary period of the timing signal Sct. The multiplier may be an integer, but other multipliers may be chosen instead. For example, for each test frequency signal the test signal generator 220 may include a counter that provides a specific division (e.g. Tf0/N, N is a constant integer) of the driving frequency T_f0. Preferably, each test frequency signal T_mf1 . . . T_mfn has a constant relation to the driving frequency T_f0 of the vibrational primary mode. This is achieved for instance by using a constant divider in a counter arranged for generating any of the respective test frequency signals T_mf1 . . . T_mfn, so that the length of each period of the respective test frequency signal T_mf1 . . . T_mfn is a constant multiple of the primary period of the driving frequency T_f0 of the vibrational primary mode. Test frequency signals T_mf1 . . . T_mfn are preferably square-wave signals (for example from the phase-locked loop (PLL) of the drive circuit), but other signals, like sinusoidal signals may be applied, as well.

The test signal generator 220 may be further adapted to include a modulator element that may include a group of one or more modulators for multiplying the primary signal Sc with each of the generated test frequency signals T_mf1 . . . T_mfn, respectively. The test signal generator may generate test input signals Tt1 . . . Ttn corresponding to the test frequency signals T_mf1 . . . T_mfn, respectively, or to generate one test input signal Tt1 that includes the test tones of the test frequency signals T_mf1 . . . T_mfn. The modulator element output may be input to the sense feedback loop continuously, according to a predefined scheme, to test whether the gyroscope operates in an intended manner.

Figure 6:
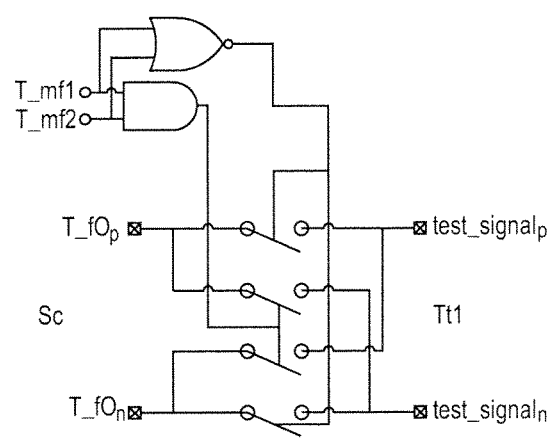
FIG. 6 illustrates components of a test signal modulator.

As an example, FIG. 6 illustrates components of a test signal modulator for double frequency square wave modulation of the sinusoidal primary signal Sc. In FIG. 6, elements T_f0n, T_f0p illustrate primary signal inputs, and elements T_mf1, T_mf2 test frequency inputs. As can be seen from FIG. 6, the circuitry is adapted to output one differential test signal Tt1 (test_signal$_p$, test_signal$_n$) that includes the test tones of T_mf1, T_mf2.

Figure 7A:
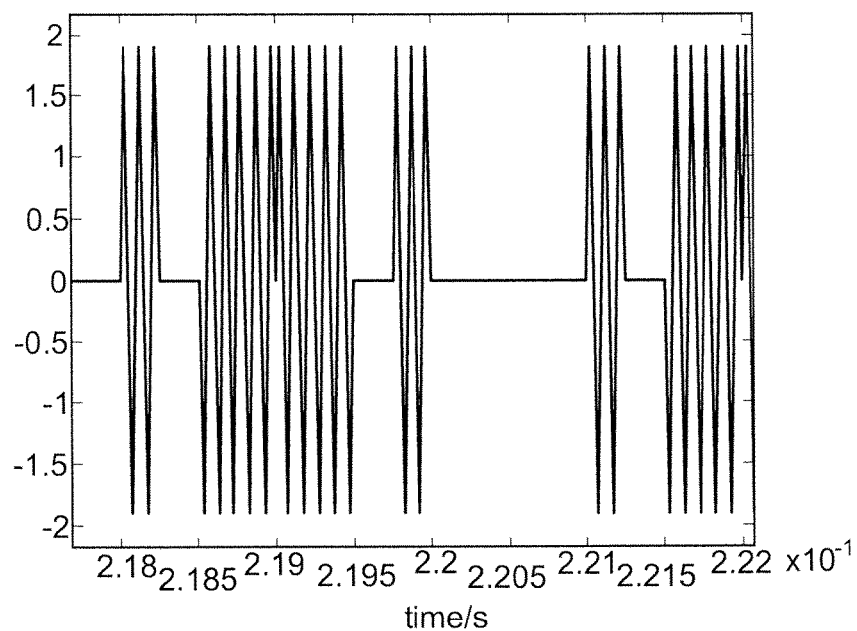
FIGS. 7A and 7B illustrate test signal modulation with an exemplary test input signal.
Figure 7B:
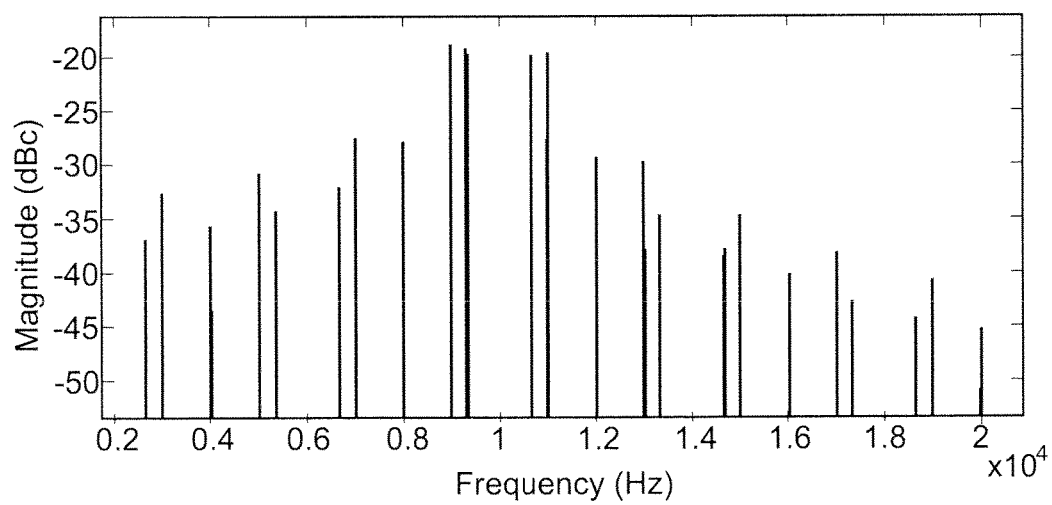
Figure 8A:
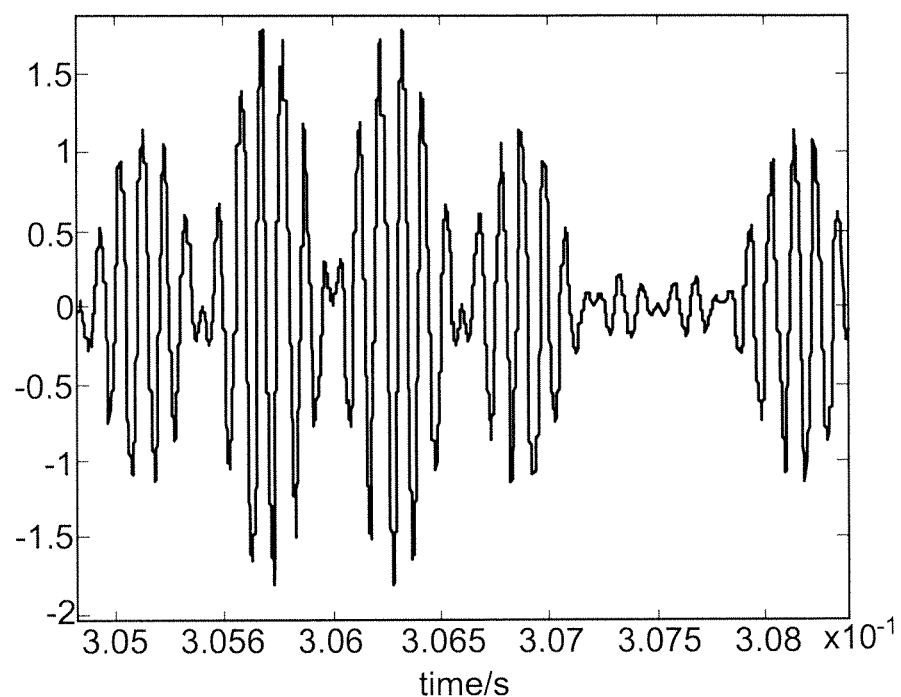
FIGS. 8A and 8B show an alternative exemplary test input signal.
Figure 8B:
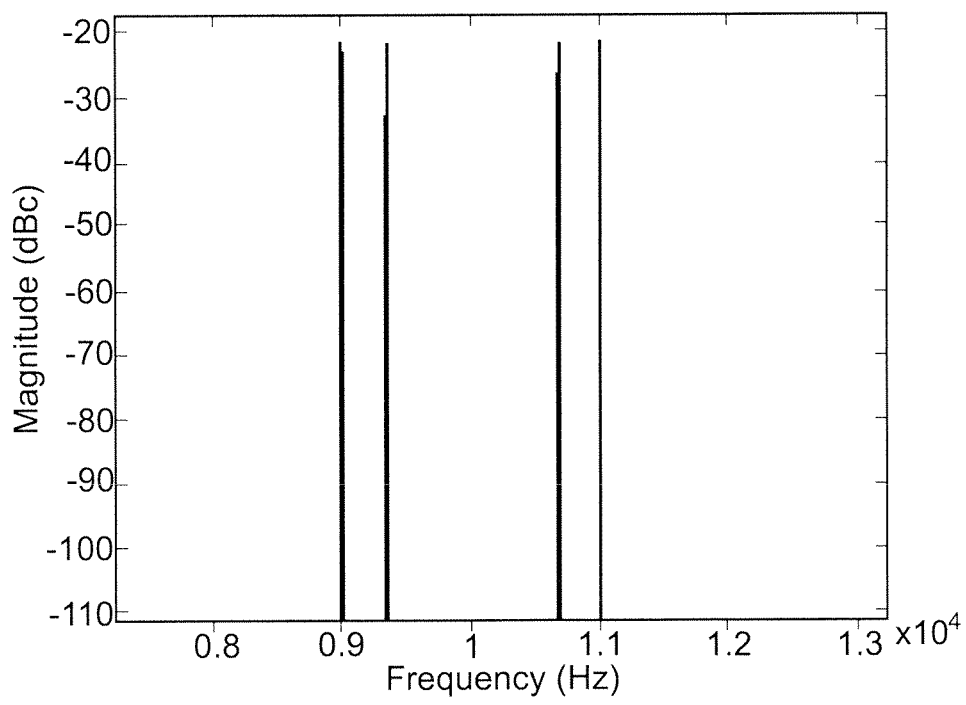

FIGS. 7A and 7B illustrate the test signal modulation with an exemplary test input signal Tt1 that is created by modulating a 10 kHz carrier signal with two square wave test frequency signals. FIG. 7A shows the test signal in time domain and FIG. 7B in frequency domain. FIGS. 8A and 8B show an alternative exemplary test input signal Tt1 that is created by modulating the carrier signal with two sinusoidal wave test frequency signals. FIG. 8A shows the test input signal in time domain and FIG. 8B in frequency domain. It is seen that in order to prevent the test from creating rotation rate offset to the actual measurement, the test input signal does preferably not contain a signal component at the exemplary resonance frequency 10 kHz.

It is understood that the sense loop output signal Ssl, and the sense output signal Ss in FIG. 5 include components of the test input signals Tt1 . . . Ttn and components of the detected angular motion. In the demodulation element, signal paths of different purposes need to be separated. Until this point, the self-test stages may be implemented in the analog domain. In FIG. 5, the demodulation element includes two demodulation stages DEM1, DEM2. The first demodulation stage DEM1 corresponds to the demodulation element of FIG. 2. After the first demodulation stage DEM1, the signal Ss may be applied for angular motion measurements, as discussed above. The effects of the test signals may be eliminated from the output signal Ss with filtering. For example, the signal path may be adapted to include a decimating filter (e.g. a cascaded integrator-comb) with a specific output data rate selected to output zero at the test input signal frequency (frequencies). It is noted that this filtering stage is inherently needed in a closed loop configuration. Accordingly, the signal path does not need any additional elements for the self-test function. It is understood that various other signal processing stages, well known to a person skilled in the art, may be included in the common signal path, and the separated signal paths. An example of such stages is filtering of unwanted harmonics of the resonance frequency or an application specific signal frequency band.

For self-test purposes, the demodulator element may also include a second demodulation stage DEM2 with one or more demodulators adapted to demodulate the sense output signal Ss with the one or more test frequency signals T_mf1 . . . T_mfn, and to thereby generate one or more DC response signals St1 . . . Stn. These test response signals may be fed to a test signal analyzer 224 that includes at least one trigger condition for the one or more test response signals to fulfil. If the trigger condition is met, the test signal analyzer 224 generates an alarm signal to indicate error in the gyroscope operation. Generation and further processing of alarm signals may be implemented in many ways, well known to a person skilled in the art; they will not be discussed in more detail in this context.

For example, when the closed-loop sense is functioning properly, sense output signal Ss will contain a signal component determined by the test input. With the shown configuration, changes in, for example, the sensitivity of the feedback electrodes, in the sense or drive loop phase shifts, in the bias voltage level, in phase or magnitude of the vibrational motion in the drive or sense circuit, in the difference between the resonance frequency of the drive element and the sense element, in the transducer components and in detection sensitivity can be reliably and easily detected from the DC response signals St1 . . . Stn.

If the phase of the demodulation is not a parameter of interest, the test input signal can be created without modulation. As an alternative, it is also possible to use test frequency signals T_mf1 . . . T_mfn as test input signals Tt1 . . . Ttn. The test signal generator may feed the test frequency signals T_mf1 . . . T_mfn to the feedback sense loop without modulation. In this arrangement the primary signal Sc is not demodulated, but down-conversion of the input test signal is performed in the first demodulation stage DEM1. This reduces sensitivity of the test to the first demodulation stage DEM1 demodulation carrier phase.

Figure 9:
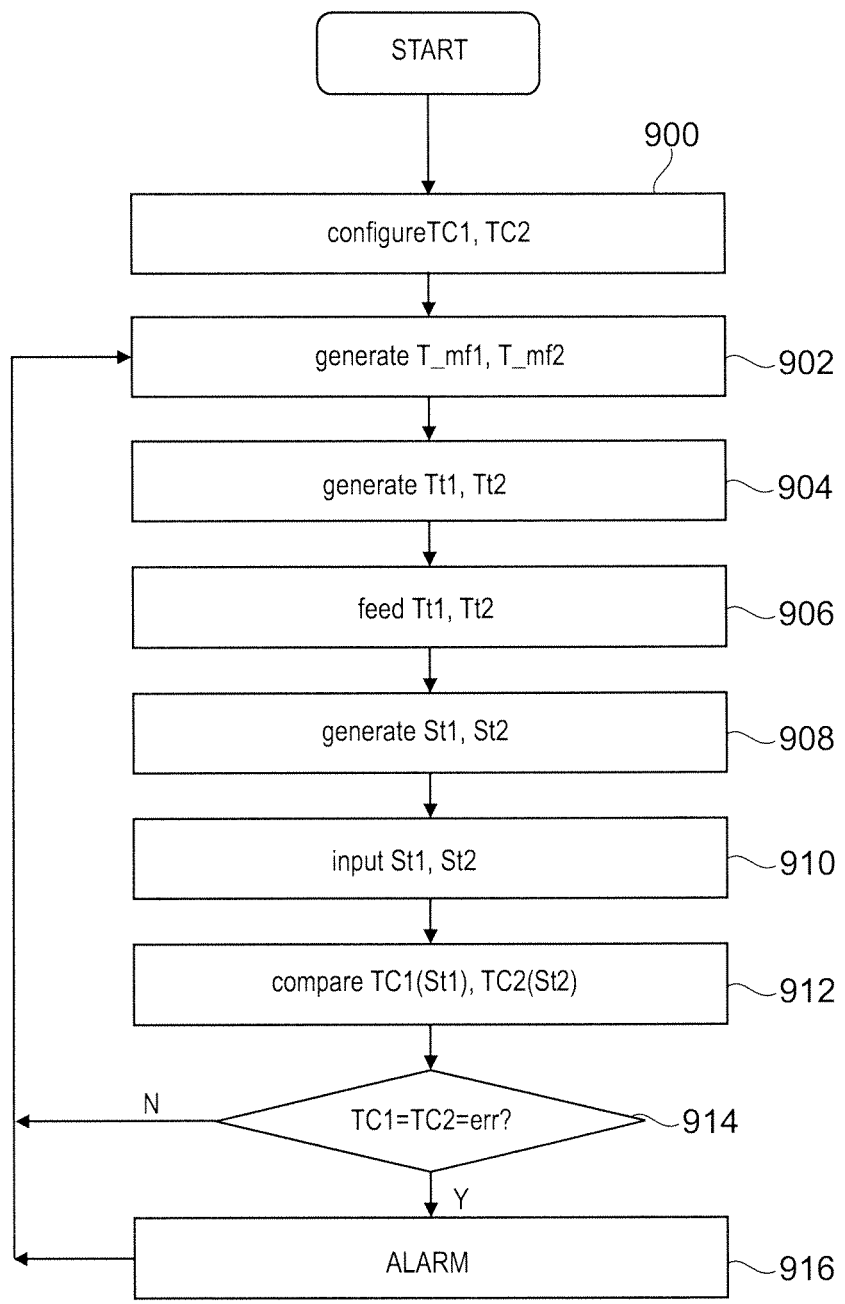
FIG. 9 illustrates an embodiment of a self-test method.

The flow chart of FIG. 9 illustrates an embodiment of a self-test method for a microelectromechanical gyroscope in the exemplary configuration of FIG. 5. An example with two test frequency signals T_mf1, T_mf2 is applied. For continuous operations, the method begins by configuring (stage 900) the test signal analyzer to include defined trigger conditions TC1, TC2 for each of the test frequency signals T_mf1, T_mf2. An expected value or a range for magnitudes of each of the test frequency input responses may be, for example, calibrated by the manufacturer, advantageously after system calibration. A simple trigger condition may include a predefined acceptable range for the DC response of a defined test frequency input. Other trigger conditions may be applied within the scope. Trigger conditions may be configured at the manufacturing stages. Trigger conditions may be implemented by means of specific circuitry and/or with a programmed process run in a processor.

Continuously during operation of the gyroscope, the test signal generator may input a primary signal Sc of a specific driving frequency T_f0 in phase with the primary vibrational motion of the drive element, and generate (stage 902) the test frequency signals T_mf1, T_mf2. The test frequency signals T_mf1, T_mf2 are synchronized to the primary signal such that the ratio of the two frequencies is constant. The test signal generator may generate (stage 904) test input signals Tt1, Tt2 by modulating the primary signal Sc with the test frequency signals T_mf1, T_mf2. The test input signals Tt1, Tt2 may be then input (stage 906) to the sense circuit. The feedback sense signal includes thus components of the vibrational secondary motion and the test input signal, and test output signals St1, St2 may be created (stage 908) continuously by eliminating from the sense signal components of the rotational motions of the body. This may be done by first demodulating the sense loop output signal Ssl with the primary signal Sc or the timing signal Sct synchronized to the primary signal Sc. DC test output responses St1, St2 may be created by demodulating the signal resulting from the first demodulation stage with the test frequency signals T_mf1, T_mf2. Validity of at least one operating parameter of the microelectromechanical gyroscope may then be determined on the basis of the test output responses St1, St2. The determination may be implemented in the digital domain.

For example, the test signal analyzer may input (stage 910) response signals St1, St2 corresponding to the number of test frequency inputs T_mf1, T_mf2. The test signal analyzer may be adapted to compare (stage 912) received response signals St1, St2 to the trigger conditions TC1, TC2 and check (stage 914) whether a required compliance exists. If not, an alarm may be triggered (stage 916).

In the example of FIG. 9, the trigger conditions TC1, TC2 define acceptable value ranges for the response signals St1, St2. If a received response signal is not in the range defined for it, an error condition is flagged (stage 914). A required compliance may be defined to exist when both comparisons result into a flagged error. This dual error detection effectively eliminates the possible false alarms. However, other trigger conditions and compliance requirements may be applied within the scope. Furthermore, more than two test frequency inputs may be applied, depending on the device parameters to be tested.

Figure 10:
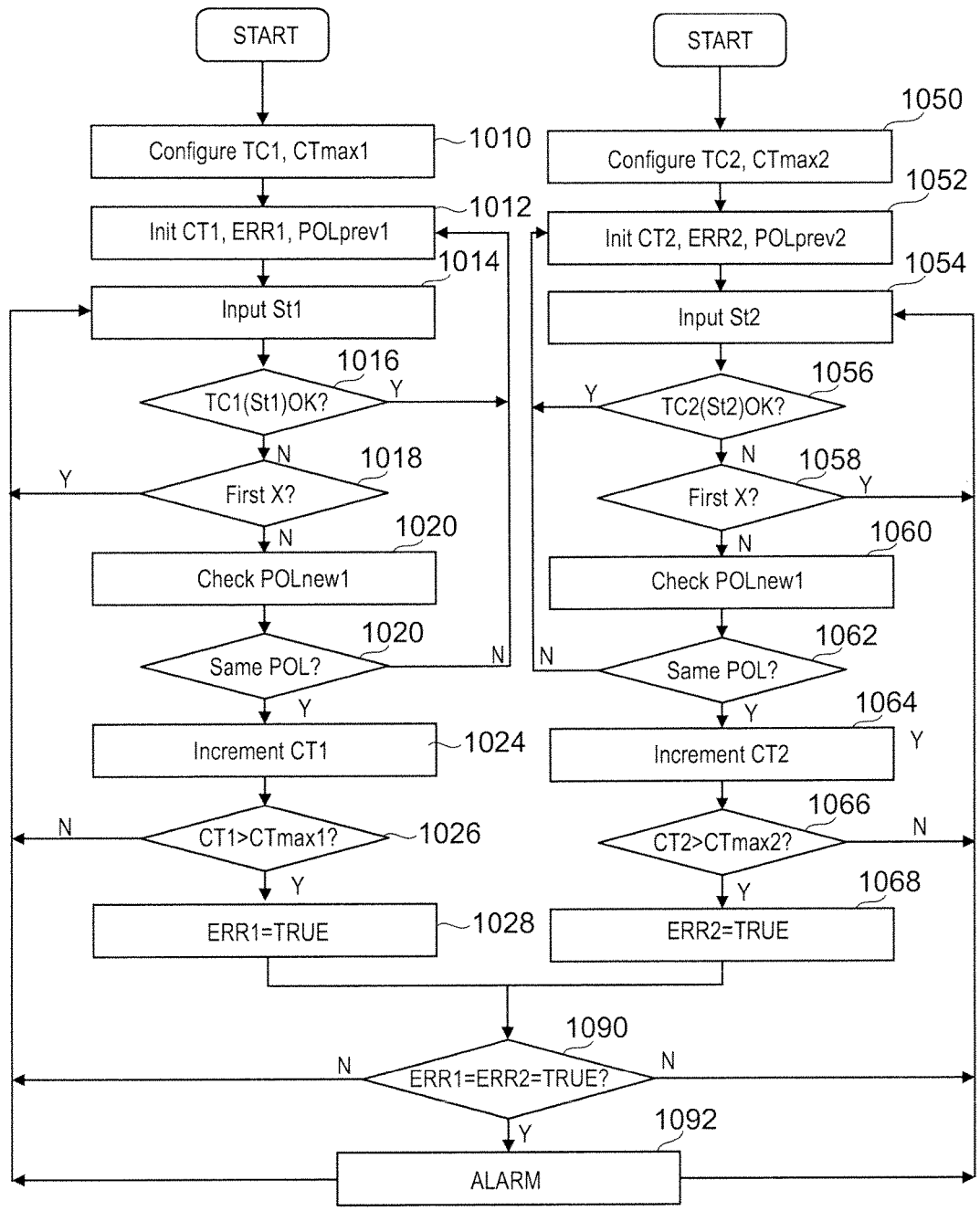
FIG. 10 illustrates a further embodiment of a gyroscope self-test method.

FIG. 10 illustrates a further embodiment of a gyroscope self-test method. The embodiment applies the dual error detection and enhances the error detection by a further polarity check that reduces false alarms by spurious external motions in challenging operational environments. In FIG. 10, the left-hand flow relates to a first test tone and the right-hand flow to a second test tone. In the left-hand flow, the method begins by configuring (stage 1010) the test signal analyzer of the gyroscope to include a first trigger condition TC1 that sets an acceptable range for response signals St1 of a first test frequency input T_mf1, and with a first polarity counter threshold CTmax1 that sets a limit for successive abnormal values of same polarity. For the process, parameters POLprev1, CT1, and ERR1 are initialized (stage 1012). When a response signal St1 is received (stage 1014), it is checked (stage 1016) whether the signal value complies with the first trigger condition TC1. If yes, the process may return to stage 1012 for initialization and then continue receiving the response signal SU. If not, the test signal analyzer will check (stage 1018) whether the defined range is crossed for the first time or not. If the crossing happens for the first time, it is deemed that the process may return to stage 1014.

If the crossing does not happened for the first time, the test signal analyzer will check (stage 1020) the polarity of the crossing, i.e. whether the value raises above or falls below the defined range. The determined polarity is then compared (stage 1022) to the polarity POLprev1 in a previous crossing of the defined range. If the polarity of the present crossing POLnew1 is not the same as the polarity of the previous crossing POLprev1, the process may return to stage 1012 to reset the counter and polarity values CT1. In the initialization/reset stage 1012, the parameter POLprev1 may be initially given either of the negative or positive polarity values, and later on the value of the polarity value POLnew1, resulting from stage 1020. If the determined polarity of the present crossing POLnew1 is the same as the polarity POLprev1 in the previous crossing, a first polarity counter CT1 is incremented (stage 1024).

The incremented value of the first polarity counter CT1 is compared to the predefined first polarity counter threshold CTmax1 (stage 1026). If the counter value CT1 is below the threshold, the process may return to stage 1014. If the counter value exceeds the threshold, a Boolean variable ERR1 that indicates a detected error state in the first flow path is set to TRUE (stage 1028).

Similarly, in the right-hand flow, the method begins by configuring (stage 1050) the test signal analyzer of the gyroscope to include a second trigger condition TC2 that sets an acceptable range for response signals St2 of a second test frequency input T_mf2, and with a second polarity counter threshold CTmax2 that sets a limit for successive abnormal values of same polarity. For the process, parameters POLprev2, CT2, and ERR2 are initialized (stage 1052). When a response signal St2 is received (stage 1054), it is checked (stage 1056) whether the signal value complies with the second trigger condition TC2. If yes, the process may return to stage 1052 for initialization and then continue receiving the response signal St2. If not, the test signal analyzer will check (stage 1058) whether the defined range is now crossed for the first time or not. If the crossing happens for the first time, it is deemed that the process may return to stage 1054.

If not, the test signal analyzer will check (stage 1060) the polarity of the crossing, i.e. whether the value raises above or falls below the defined range. The determined polarity POLnew2 is then compared (stage 1062) to the polarity POLprev2 in a previous crossing of the defined range. If the polarity of the present crossing POLnew2 is not the same as the polarity of the previous crossing POLprev2, the process may return to stage 1052 to reset the counter and polarity values. Also in the initialization/reset stage 1052, the parameter POLprev2 may be initially given either of the negative or positive polarity values, and later on the value of the polarity value POLnew2, resulting from stage 1060. If the determined polarity POLnew2 is the same as the previous polarity POLprev2, a second polarity counter CT2 is incremented (stage 1064). The incremented value of the second polarity counter CT2 is compared to the predefined second polarity counter threshold CTmax2 (stage 1066). If the counter value is below the threshold, the process may return to stage 1054. If the counter value exceeds the threshold, a Boolean variable ERR2 that indicates a detected error state in the second flow path is set to TRUE (stage 1068).

The test signal analyzer may now check (stage 1090) the variables ERR1, ERR2, and if both of them are TRUE, trigger an alarm (stage 1092), and return to stages 1014, 1054 to continue reception of the test responses St1, St2. If only one, or neither of the variables ERR1, ERR2 in stage 1090 is TRUE, the process may return directly to stages 1014, 1054.

The described additional polarity check effectively eliminates unnecessary alarms, and makes therefore the self-test function robust and therefore suitable to very demanding applications.

Figure 11:
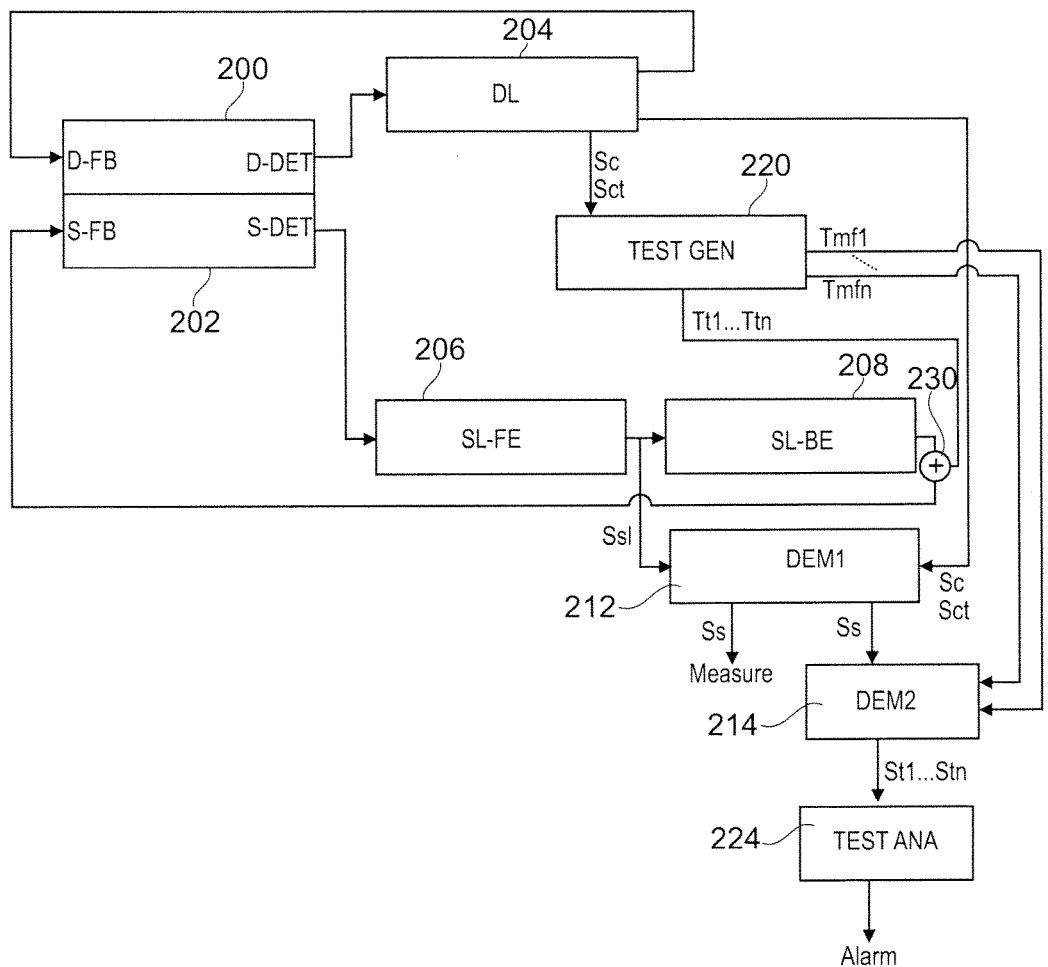
FIG. 11 illustrates an alternative embodiment of a gyroscope with a continuous self-test arrangement.

FIG. 11 illustrates an alternative embodiment of a gyroscope with a continuous self-test arrangement. Elements already discussed in FIGS. 2 and 5 are denoted with same reference numerals. As a difference to the embodiment of FIG. 5, the test signals Tt1 . . . Ttn are shown to be fed to a summing element 230 after sense loop back-end part (SL-BE) 208. This may be used to emphasize abnormal feedback path effects in self-test response. It also enables to provide signal equivalent response to the system output within the signal band.

Figure 12A:
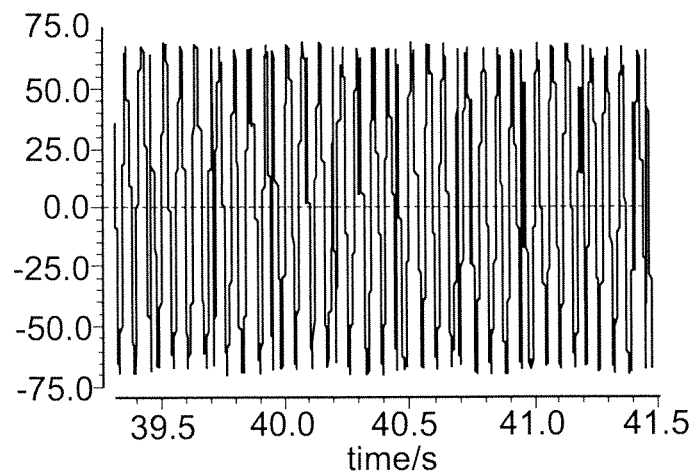
FIGS. 12A to 12C illustrate signals created with the earlier exemplary configurations.
Figure 12B:
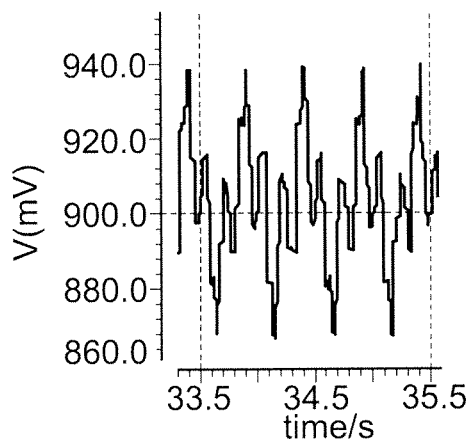
Figure 12C:
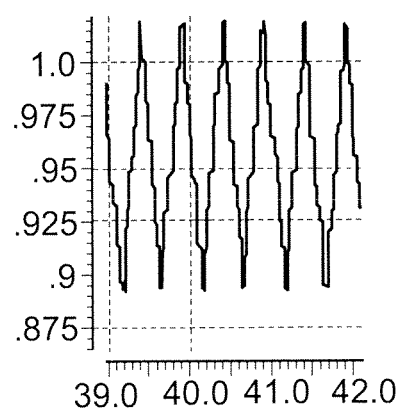

FIGS. 12A to 12C illustrate signals created with the exemplary configurations of FIG. 5 and FIG. 11. FIG. 12A illustrates a test signal Tt1 that is input to the sense feedback loop. The exemplary Tt1 is a single frequency square wave modulated signal. FIG. 12B shows an output response signal Ss for the arrangement of FIG. 5, and FIG. 12C shows an output response signal Ss for the arrangement of FIG. 11. It is seen that the response signal Ss may include multiple harmonic frequency components, but the tone of the test frequency input is, however, the most relevant for the DC output and for analysis.

Figure 13A:
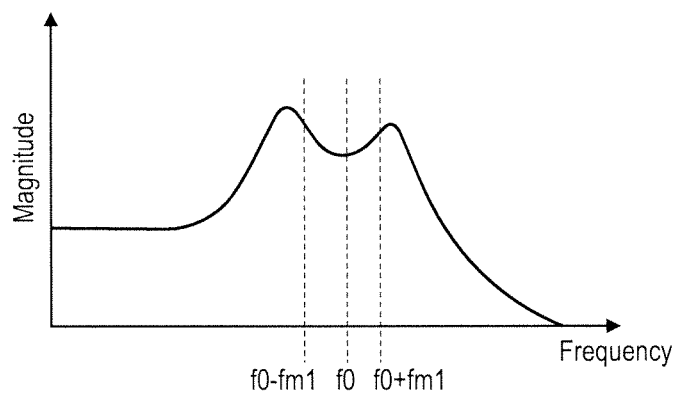
FIG. 13A illustrates an exemplary closed loop gain of the sense feedback loop as a function of frequency from the input of the test input signal to the output of the sense loop output signal in FIG. 11.
Figure 13B:
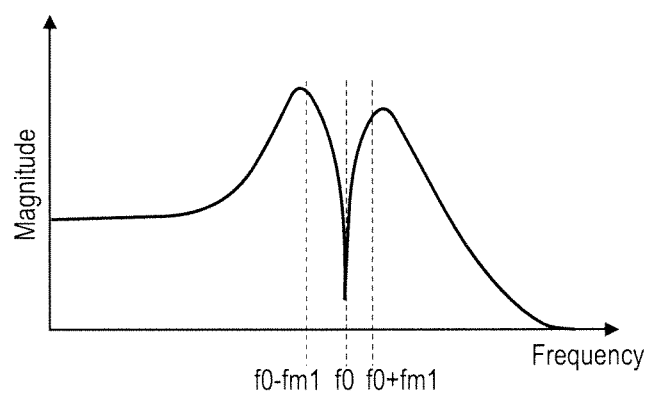
FIG. 13B illustrates an alternative closed loop gain curve from the input of the test input signal to the output of the sense loop output signal in FIG. 5.

In an embodiment, the gyroscope is a mode-matched device where the drive and sense element resonance frequencies are equal and the sense feedback loop includes a low pass filter with a frequency response function that peaks in the mechanical resonant frequency of the sense element 202. With peaking of a frequency response function of a low pass filter it's meant that the natural frequency of the low pass filter equals with the mechanical resonant frequency of the sense element 202, and the Q value of the low pass filter is higher than 1. FIG. 13A illustrates an exemplary closed loop gain of such sense feedback loop as a function of frequency from the input of the test input signal(s) to the output of the sense loop output signal(s) in the arrangement of FIG. 11. FIG. 13B illustrates the corresponding closed loop gain curve in the arrangement of FIG. 5. It has been detected that in this type of gyroscopes, it is advantageous to set the test frequency inputs close to the unity gain-bandwidth product frequency of the loop, i.e. to a range where the loop gain becomes low, typically between −6 and 6 dB, preferably between −3 and 3 dB. In this range, the sense feedback loop sensitivity to parameter variations is highest and therefore facilitates improved detection and analysis of test signal responses. By means of this, the probability of groundless error alarms is significantly reduced, and the improved continuous self-test can be implemented with minimal additional mechanical or analog elements in addition to the ones already needed for the closed-loop operation.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical gyroscope, comprising:
    a body;
    a drive element suspended to the body for vibrational primary motion in a first direction;
    a drive circuit, wherein the drive element is configured to input into the drive circuit a drive sense signal that corresponds to the vibrational primary motion of the drive element, and wherein the drive circuit is configured to generate from the drive sense signal a timing signal and a primary signal corresponding to the vibrational primary motion;
    a sense element coupled to the drive element and configured to receive an orthogonal Coriolis force component in a second direction, wherein the second direction is perpendicular to the first direction;
    a sense circuit configured to output a sense signal that corresponds to forces acting on the sense element in the second direction, and to produce a sense feedback signal to control the vibrational secondary motion of the sense element;
    a test circuit, including:
        a test signal generator configured to receive from the drive circuit the primary signal and the timing signal, to generate from the primary signal at least one test input signal comprising the primary signal modulated with at least one test frequency signal, the period of each of the at least one test frequency signals being a multiple of a primary period of the timing signal, and to output the test input signal during operation of the microelectromechanical gyroscope to the sense circuit; and
        a self-test analyzer configured to extract from the sense signal at least one test output signal that results from the at least one test input signal, and to determine validity of at least one operating parameter of the microelectromechanical gyroscope on a basis of the test output signal.

2. A microelectromechanical gyroscope according to claim 1, wherein the sense element includes a transducer configured to convert the sense feedback signal into a force component in the second direction.

3. A microelectromechanical gyroscope according to claim 1, wherein the sense element has a resonant frequency equal to a resonant frequency of the drive element; and wherein
the sense circuit includes a low pass filter with a frequency response function that is configured to peak in the mechanical resonant frequency of the sense element.

4. A microelectromechanical gyroscope according to claim 1, wherein
a closed loop gain of the sense circuit varies as a function of frequency; and wherein
the test input signals are adjusted to a range where the loop gain is between −6 and 6 dB.

5. A microelectromechanical gyroscope according to claim 4, wherein the test input signals are adjusted to a range where the loop gain is between −3 and 3 dB.

6. A microelectromechanical gyroscope according to claim 1, wherein
the test signal generator is configured to input a primary signal in phase with the vibrational primary motion of the drive element,
wherein the test signal generator is configured to generate at least one test frequency signal such that a cycle of the at least one test frequency signal is a constant integer multiple of a cycle of the vibrational primary motion,
and wherein the test signal generator is configured to generate the test input signal by modulating the primary signal with the at least one test frequency signal.

7. A microelectromechanical gyroscope according to claim 1, wherein
the test signal generator is configured to input a primary signal in phase with the vibrational primary motion of the drive element,
wherein the test signal generator is configured to generate at least one test frequency signal such that a cycle of the at least one test frequency signal is a constant multiple of a cycle of the vibrational primary motion,
and wherein the test signal generator is configured to use the at least one test frequency signal as the test input signal.

8. A microelectromechanical gyroscope according to claim 1, wherein the self test analyzer comprises:
a first demodulator configured to create a first output signal by demodulating the sense signal with the primary signal;
a second demodulator configured to create a second output signal by demodulating the first output signal with the test frequency signal;
a test signal analyzer configured to determine validity of the at least one operating parameter of the microelectromechanical gyroscope on a basis of the second output signal.

9. A microelectromechanical gyroscope according to claim 1, wherein the primary signal includes components in phase with at least one of position or velocity of a mass undergoing the vibrational primary motion in the drive element.

10. A microelectromechanical gyroscope according to claim 1, wherein the test input signal is input to a front end part of the sense circuit.

11. A microelectromechanical gyroscope according to claim 1, wherein the test input signal is input into the sense circuit after a front end part of the sense circuit.

12. A microelectromechanical gyroscope according to claim 1, wherein the test signal generator is configured to create at least two test output signals, and the test signal analyzer is configured to determine validity of the at least one operating parameter of the microelectromechanical gyroscope on a basis of both of the at least two test output signals.

13. A microelectromechanical gyroscope according to claim 12, wherein the test signal generator is configured to create two test output signals, and the operating parameter is deemed invalid if both of the test output signals are invalid.

14. A microelectromechanical gyroscope according to claim 1, wherein the test signal analyzer is configured to create an alarm in response to the at least one operating parameter being determined invalid.

15. A microelectromechanical gyroscope according to claim 1, wherein the test signal analyzer is configured to store a triggering condition for the at least one test output signal, and to determine the at least one operating parameter invalid in response to the one test output signal not fulfilling its triggering condition.

16. A microelectromechanical gyroscope according to claim 15, wherein the test signal analyzer is configured to store a triggering condition for two or more test output signals, and to determine the at least one operating parameter invalid based on whether the two or more test output signals fulfil their respective triggering conditions.

17. A microelectromechanical gyroscope according to claim 16, wherein the test signal analyzer is configured to store a triggering condition for two test output signals, and to determine at least one operating parameter invalid if both of the two test output signals fails to fulfil their respective triggering conditions.

18. A microelectromechanical gyroscope according to claim 15, wherein the triggering condition or each of the triggering conditions include a range for values of its respective test output signal.

19. A microelectromechanical gyroscope according to claim 18, wherein in response to a test output signal failing to fulfil its respective triggering condition, the test signal analyzer is configured to check whether a similar failure has occurred previously, and to determine an error condition only if a similar failure has occurred previously for a predefined number of times.

20. A microelectromechanical gyroscope according to claim 19, wherein in a positive group of similar failures, values of the test output signal exceed an upper threshold of the range, and in a negative group of similar failures, values of the test output signal fall below a lower threshold of the range.

21. A self-test method for a microelectromechanical gyroscope, the gyroscope comprising:
a body, a drive element suspended to the body for vibrational primary motion in a first direction, and a drive circuit configured to receive from the drive element a drive sense signal that corresponds to the vibrational primary motion of the drive element, wherein the drive circuit is configured to generate from the drive sense signal a timing signal and a primary signal corresponding to the vibrational primary motion;
a sense element coupled to the drive element and configured to receive an orthogonal Coriolis force component in a second direction, wherein the second direction is perpendicular to the first direction; and
a sense circuit configured to output a sense signal that corresponds to forces acting on the sense element in the second direction, and to produce a sense feedback signal to control the vibrational secondary motion of the sense element, the method comprising:
receiving from the drive circuit the primary signal and the timing signal;

generating from the primary signal at least one test input signal synchronized to the vibrational primary motion, the at least one test input signal comprising the primary signal modulated with at least one test frequency signal, the period of each of the at least one test frequency signals being a multiple of a primary period of the timing signal;

outputting the test input signal during operation of the microelectromechanical gyroscope to the sense circuit; and extracting from the sense signal at least one test output signal that results from the at least one test input signal, and determining validity of at least one operating parameter of the microelectromechanical gyroscope on the basis of the test output signal.

* * * * *